Patented Dec. 14, 1926.

1,610,226

UNITED STATES PATENT OFFICE.

EDUARD SALOMON ALI COHEN, OF THE HAGUE, NETHERLANDS.

PROCESS FOR THE MANUFACTURE OF DRY WELL-PRESERVED RUBBER FROM LATEX.

No Drawing. Application filed March 31, 1924, Serial No. 703,249, and in the Netherlands April 12, 1923.

This invention relates to an improved process for the manufacture of dry, well preserved rubber from latex.

The essential feature of the Brazilian process of rubber manufacture consists in dipping a flat wooden paddle into the latex, which is then subjected to the action of heat and of the smoke from special kinds of nuts and firewood. In this manner the latex is coagulated and dried, whereupon new dippings, heatings and smokings follow until a ball or biscuit of rubber is formed which can be put on the market.

This simple process, however, is not suitable on estates where large quantities of latex have to be treated. Here a process has come into use which consists in adding an acid to the latex until it coagulates. The freshly coagulated rubber, a fine spongy material which should be treated with the utmost care, is then put into machines with heavy, grooved iron rollers in order to remove all the acid by mechanical washing and rolling and to form the rubber into sheets. The sheets are creped and dried and sold as crepe or "smoked sheet."

In this process it is evident that, contrary to the Brazilian method, in which the latex is coagulated with much care without removing protein or other constituents and the rubber product obtained is already preserved by the carbon particles of the smoke, the coagulation with acid on the estates removes proteins from the latex, does not add preserving carbon particles before coagulation, and finally, subjects the fresh coagulum to a heavy friction and tearing.

In addition the rubber-product obtained may then be subjected to heat and smoke, while in Brazil this treatment is applied to the latex.

It may be safely presumed that these reasons are the principal cause why Brazilian rubber (hard Pará) is still considered as a superior product having a stronger "nerve" than estate rubber, is better preserved against the action of sun and climate, has a superior elasticity and generally commands a higher price.

These considerations, combined with the fact that nowadays more attention is paid to the addition of finely divided carbon to rubber mixtures in order to obtain a longer life and more elasticity and density of the articles and products manufactured therewith, have led to the present invention, which makes it possible to combine a larger quantity of carbon with the constituents of the latex than according to the Brazilian method, and in such a manner that a coagulum is obtained containing all the constituents of the latex without the addition of detrimental acids or chemicals, which coagulum can be worked into sheets on a large scale in the most simple way without being subjected to a mechanical washing or treatment.

The machines now used for washing and sheet-rolling become superfluous, the power and labour required for them are saved, and in this way the costs of production are diminished. The rubber obtained is of a superior quality, drying quicker than other rubber, and is very easily made plastic and workable in rubber manufactures.

The invention consists in mixing latex with a highly dispersed suspension, such as a colloidal suspension of carbon.

The carbon employed is a finely divided carbon such as lamp black. Other kinds of carbon may be used, provided that they are extremely finely divided. Such kinds of carbon are known, as has been remarked already, as compounding ingredients in rubber compositions. It is also well known to add compounding ingredients for rubber composition to latex before it is coagulated or dried. It is, however, novel to add carbon to latex as a highly dispersed suspension, such as a colloidal suspension; and it is only in this manner that such an intimate union of rubber particles and carbon particles is effected, that the advantages of the present process are obtained.

When carrying out the invention one may proceed for instance as follows:

The latex is diluted with pure water, which should contain as little lime as possible, and filtered through cloth or gauze.

A dispersion or suspension of colloidal carbon is made in a boiler by combining well purified carbon with a dilute solution of an ammoniacal or other alkaline fatty acid. The whole is intimately mixed and heated to a temperature of about 50° C., after which the diluted latex, which has also a colloidal nature, is added slowly to it, the temperature being raised to about 70° C. This temperature is maintained with continuous agitation for a considerable time.

If chemicals such as ammonia were originally added for preserving the fluidity of the latex, the elevated temperature should be maintained until the ammonia or other preservative has been distilled off.

Meanwhile in a separate vat, is prepared a solution of a substance which is capable of coagulating the alkaline fatty acid latex compound, such as a sulphate, for instance alum.

When the coagulating substance has been added in the required proportion, and coagulation has taken place, the coagulum is washed with a large quantity of water and put on a gauze, cloth or sieve, where the adhering moisture drips off, after which it is rolled by two wooden or rubber rollers into the form of sheets, which are dried and are then fit for the market.

In this method of mixing and coagulating, the fatty acid used for emulsifying the carbon remains in the rubber composition. The quantity is only a small percentage of the quantity of rubber, but it bestows on the rubber properties which are desirable for many purposes, for instance, it makes it more easy to treat and to mix with compounding ingredients in the rubber mills.

However, it is not necessary to use the alkali or ammonia compounds of fatty acids (including acids derived from fats and oils, such as derivatives of castor oil, Turkey red oil, etc.) alone as emulsifying agents for carbon, since mixtures of such compounds with mineral or vegetable oils and fats, and also saponin and other dispersing agents may be used. The peptizing action may also be effected by mechanical means in a colloid mill, with or without the addition of chemicals.

The essential feature of the invention is the mixing of latex with very finely divided carbon in a dilute solution of an alkaline fatty acid. This results in a chemical or mechanical union between rubber particles and carbon particles, which causes the coagulated product to be freed from detrimental acids and putrefying germs by an absolutely neutral preservative and to be preserved thereby. It is further easily washed with cold water and easily rolled into sheets with very simple implements. The costly treatments at present practiced on the estates, which are detrimental to the quality of the rubber, will no longer be required.

The coagulation may be effected in any desired manner. Many or nearly all solid constituents of the latex remain in the coagulum. Coagulation with alum is very suitable.

Of course it is also possible to obtain a dry rubber product by evaporation, but coagulation is cheaper.

The quantity of carbon which is introduced into the latex may vary between wide limits, depending on the object for which the rubber is to be used.

What I claim is:

1. A process for the manufacture of dry, well preserved rubber from latex, consisting in preparing a colloidal suspension of lamp black in an alkaline solution of a fatty acid, heating the said suspension to a moderate temperature, mixing it with latex while agitating and maintaining a sufficient temperature to volatilize any volatile anti-coagulants, and then coagulating the mixture.

2. A process for the manufacture of dry, well preserved rubber from latex, consisting in preparing a colloidal suspension of lamp black in a solution of soap, heating the said suspension to approximately 50° C., gradually mixing it with sieved and suitably diluted latex while increasing the temperature to about 70° C., agitating the mixture while maintaining the said temperature until the volatile anti-coagulants have distilled off, and then coagulating the mixture with alum.

3. A process for the manufacture of dry, well preserved rubber from latex, consisting in preparing a colloidal suspension of lamp black in a solution of soap containing oils, heating the said suspension to approximately 50° C., gradually mixing it with sieved and suitably diluted latex while increasing the temperature to about 70° C., agitating the mixture while maintaining the said temperature until the volatile anti-coagulants have distilled off, and then coagulating the mixture with alum.

4. A process for the manufacture of dry, well preserved rubber from latex, comprising the steps of forming a highly dispersed colloidal suspension of carbon by combining lamp black with an alkaline solution of a fatty acid, mixing the latex with such colloidal suspension, and then treating the mixture with a sulphate having a coagulating action thereon.

5. A process for the manufacture of dry, well preserved rubber from latex, comprising the steps of forming a highly dispersed colloidal suspension of carbon by combining lamp black with alkaline solution of a fatty acid, mixing the latex with such colloidal suspension, and then coagulating the mixture with alum.

6. A process for the manufacture of dry, well preserved rubber from latex, consisting in preparing a colloidal suspension of lamp black in a solution of soap, heating the said suspension to a moderate temperature, mixing it with latex while agitating and maintaining a sufficient temperature to volatilize any volatile anti-coagulants, and then coagulating the mixture.

7. A process for the manufacture of dry, well preserved rubber from latex, consisting in preparing a colloidal suspension of lamp black in a solution of soap, heating the said suspension to a moderate temperature, mixing it with latex while agitating and maintaining a sufficient temperature to volatilize any volatile anti-coagulants, and then coagulating the mixture with alum.

In testimony whereof I affix my signature.

EDUARD SALOMON ALI COHEN.